No. 823,748. PATENTED JUNE 19, 1906.
F. E. WALDEN.
CLAMP.
APPLICATION FILED AUG. 26, 1905.
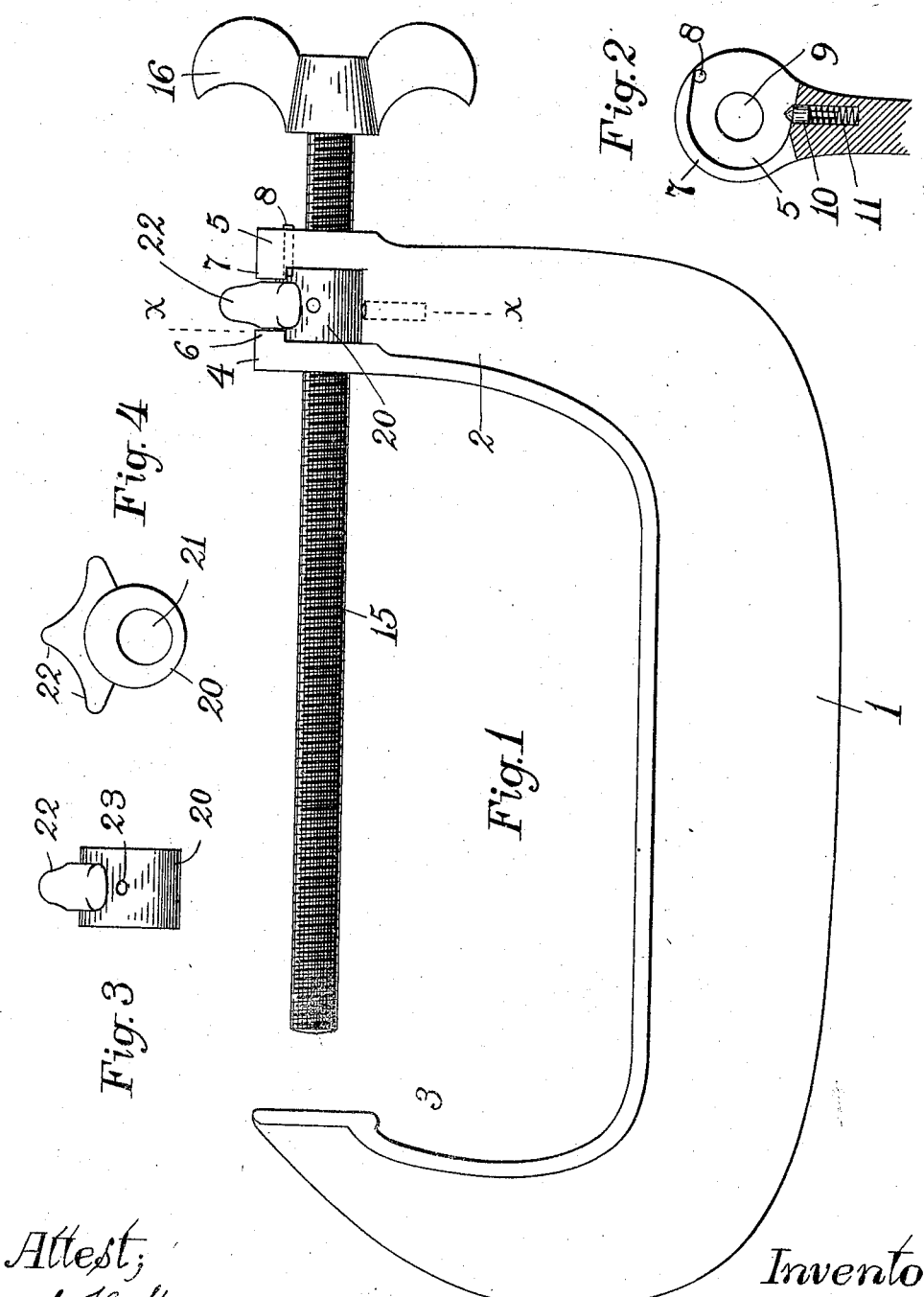
Attest:
J. H. Ware
Inventor,
Frederick E. Walden;
By A. B. Upham
Atty.

UNITED STATES PATENT OFFICE.

FREDERICK E. WALDEN, OF WORCESTER, MASSACHUSETTS, ASSIGNOR TO BAY STATE TOOL COMPANY, OF BOSTON, MASSACHUSETTS, A CORPORATION OF MAINE.

CLAMP.

No. 823,748.　　　Specification of Letters Patent.　　　Patented June 19, 1906.

Application filed August 26, 1905. Serial No. 275,879.

*To all whom it may concern:*

Be it known that I, FREDERICK E. WALDEN, a citizen of the United States, and a resident of Worcester, in the county of Worcester, Commonwealth of Massachusetts, have invented certain new and useful Improvements in Clamps, of which the following is a full, clear, and exact description.

The object of this invention is the construction of an improved clamp wherein the clamp-screw can be quickly adjusted from one extreme to the other by a sliding movement and then turned to give the clamping action.

Referring to the drawings forming part of this specification, Figure 1 is a side view of a C-clamp having my improvements applied thereto. Fig. 2 is a sectional view on the line X X in Fig. 1. Fig. 3 is a peripheral view of the release-nut, and Fig. 4 is an end view of the same.

The C-clamp 1 is formed with the usual arm for holdng the clamping-screw and the clamping-arm 3. The screw 15 is of the usual character, being provided with suitable means for its operation, as the thumb head 16. The novelty consists in the arrangement by means of which said screw can be quickly shifted from one point to another. This is as follows: At the end of the arm 2 and integral therewith are abutments 4 and 5, between which is located the nut 20, within which said screw can be turned for its longitudinal adjustment. The internally-threaded opening 21, through which said screw passes, is made sufficiently large to permit the screw to freely slide longitudinally therein without contact when the axial centers of both are in alinement. The exterior of said nut is eccentric with said opening 21, as shown in Fig. 4, and fits within the flanges 6 and 7, formed on the said abutments 4 and 5. As the screw 15 slides in the unthreaded holes 9, made in said abutments concentric with said flanges, a partial turn of said nut will either wedge the threads formed within the opening 21 into mesh with the said screw or move the same out of mesh. Said nut is formed with means for its easy rotation, preferably three radial projections 22, arranged to receive the thumb of the operator between two neighboring projections. I prefer to locate the projections 22 in such relation to the other parts of the device that when the nut 20 is turned to move its threads out of mesh with the screw one of said projections will meet one edge of the arm 2, while the opposite projection will meet the other edge of said arm when the nut is turned to hold said threads in mesh. To insure that the nut will not be dislodged from either of said positions, I provide the locking device consisting of the small pointed plunger 10, located in a hole drilled down into the arm 2 midway between the abutments 4 and 5, as shown in Figs. 1 and 2, and pressed by a coiled spring 11 into a small depression 23 in the periphery of said nut at each end of its turn.

The flanges 6 and 7 must be cut away for a semicircumference, as shown in Figs. 1 and 2, to permit of the introduction of the nut 20 within the abutments. To prevent its dropping out when the clamping-screw is accidentally or intentionally wholly withdrawn, I drive a small pin 8 through the abutment 5 in a hole provided therefor after the nut has been put in place. This pin is located not to interfere with the rotation of the nut, but to prevent its removal, and I prefer to position this pin close beneath the overhanging extremity of the flange 7, as shown, in order that its presence shall not be visible to such evil-disposed workmen or loafers as might be otherwise minded to drive out such pin and abstract the screw, the entire clamp being too bulky to be easily secreted and stolen. In using this clamp the nut is moved to one extreme to release the clamping-screw, the latter is slid to the point desired, the nut swung back to bring it into mesh with the screw, and the thumb-piece 16 turned until the screw is forcibly clamping the work between its extremity and the clamp-arm 3.

What I claim as my invention, and for which I desire Letters Patent, is as follows, to wit:

1. The combination with a clamping member having centrally-apertured separated abutments, of a screw slidable therein, a cylindrical eccentric nut having its opening threaded to correspond with said screw but larger in diameter, and located between said abutments, semiperipheral flanges formed on said abutments and partially embracing said nut, and a locking-pin inserted at the termination of one of said flanges to prevent the withdrawal of said nut.

2. The combination with a clamping member having centrally-apertured separated abutments, of a screw slidable therein, a cylindrical eccentric nut having its opening threaded to correspond with said screw but larger in diameter, and located between said abutments, semiperipheral flanges formed on said abutments fitted to said nut, a locking-pin to prevent the withdrawal of said nut, and a pointed plunger resiliently pressed against said nut the latter being formed with depressions to partially receive said plunger, and the nut being provided with projections for its easy rotation.

In testimony that I claim the foregoing invention I have hereunto set my hand this 19th day of August, 1905.

FREDERICK E. WALDEN.

Witnesses:
    A. B. UPHAM,
    F. TUDOR.